United States Patent [19]

Andersson et al.

[11] Patent Number: 4,744,212
[45] Date of Patent: May 17, 1988

[54] METHOD OF CONTROLLING A PFBC PLANT IN THE EVENT OF OPERATIONAL DISTURBANCE IN THE GAS TURBINE UNIT AND A PFBC PLANT WITH EQUIPMENT FOR SUCH CONTROL

[75] Inventors: Mats Andersson; Kenneth Arvidsson; Peter Halse; Lennart Hjalmarsson, all of Finspong; Göran Tjellander, Norrköping, all of Sweden

[73] Assignee: ASEA AB, Sweden

[21] Appl. No.: 7,226

[22] Filed: Jan. 27, 1987

[30] Foreign Application Priority Data

Jan. 24, 1986 [SE] Sweden .............................. 8600313
Sep. 24, 1986 [SE] Sweden .............................. 8604034

[51] Int. Cl.⁴ ................................................ F02C 3/26
[52] U.S. Cl. .................................. 60/39.02; 60/39.464
[58] Field of Search ................ 60/39.02, 39.12, 39.29, 60/39.464, 39.091; 110/263, 347; 431/7, 170

[56] References Cited

U.S. PATENT DOCUMENTS

| 4,019,314 | 4/1977 | Springmann | 60/39.02 |
| 4,250,704 | 2/1981 | Bruckner et al. | 60/39.12 |
| 4,281,510 | 8/1981 | Borjesgard et al. | 60/39.464 |
| 4,306,411 | 12/1981 | Zoll | 60/39.464 |
| 4,445,844 | 5/1984 | Matthews | 431/7 |
| 4,448,286 | 12/1985 | Brannstrom | 60/39.464 |
| 4,498,285 | 2/1985 | Kreij | 60/39.464 |

Primary Examiner—Louis J. Casaregola
Attorney, Agent, or Firm—Pollock, Vande Sande & Priddy

[57] ABSTRACT

In the event of an operational disturbance in a turbine-compressor unit of a PFBC plant, the turbine and the compressor are isolated from the bed vessel of the plant by closing a valve in the gas supply conduit to the turbine and by closing a valve in the conduit leading from the compressor. At the same time a valve is opened in a by-pass conduit between the compressor and the turbine. Combustion air is allowed to escape into the atmosphere via one or more blow-off valves. The bed vessel and/or a space between the pressure vessel and the bed vessel are supplied with inert gas in such a way that combustion in the bed is damped down.

7 Claims, 5 Drawing Sheets

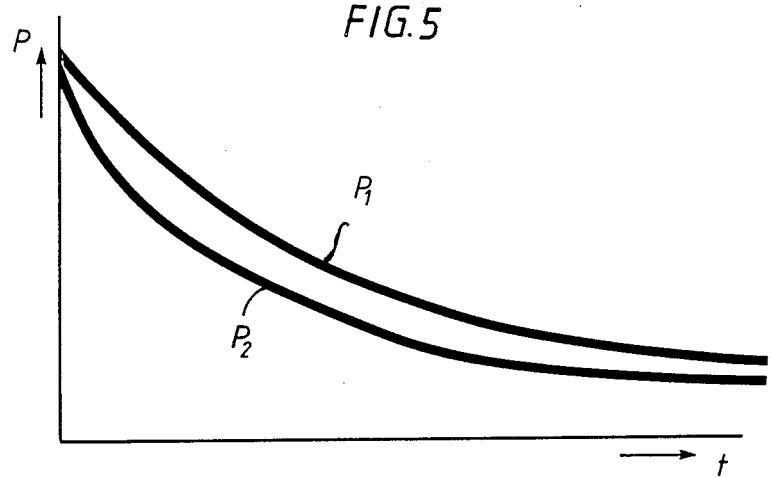

4,744,212

METHOD OF CONTROLLING A PFBC PLANT IN THE EVENT OF OPERATIONAL DISTURBANCE IN THE GAS TURBINE UNIT AND A PFBC PLANT WITH EQUIPMENT FOR SUCH CONTROL

TECHNICAL FIELD

The invention relates to a method of controlling a Pressurised Fluidised Bed Combustion (PFBC) plant in the event of an operational disturbance of a gas turbine unit forming part of the PFBC plant. Several forms of disturbance may occur during operation of a gas turbine unit which may require action to be taken to protect the turbine from damage. For example excessive speed can arise in the unit in the case of a load drop out, excessive vibrations can arise, surging can occur in a compressor of the unit, a fault can arise in an auxiliary system, or some other stability problem resulting in a gas turbine trip, i.e. shutdown of the gas turbine. The gas turbine can be shut down by opening a by-pass valve between a conduit supplying the driving gas to the turbine and the conduit containing air pressurised in the compressor driven by the turbine and a closing of cut-off valves in the gas and air conduits. The intention is to protect the gas turbine and the compressor of the unit, that is, to reduce as quickly as possible the speed as well as the pressure and temperature levels existing in the unit to harmless levels.

BACKGROUND ART

A PFBC power plant cannot, after an operational disturbance in the gas turbine, rapidly resume normal operating conditions. The very large potential contents of energy in the PFBC plant pose special problems which are difficult to solve. Since a stop valve in the conduit for the hot gases to the turbine has to be closed to protect the gas turbine, it is necessary to carry off energy from the PFBC plant in such a way that combustion and bed cooling can be controlled.

It has been proposed to allow the hot combustion gases from the bed vessel of a PFBC plant to blow-off to atmosphere. The gases have a temperature of 800°-900° C. and are mixed with about 200 ppm dust. It is difficult—not to say impossible—to cause a valve operating at such a high temperature and in such a severe environment to seal and satisfactorily clean the very large flow of gas at such a high temperature. A suitable valve would be expensive and its working life would be short. A proposal for reducing the inconvenience of leakage in a valve for blowing off combustion gases from the bed vessel is to blow off, at the same time, the compressed combustion air in a pressure vessel surrounding the bed vessel in the manner disclosed in U.S. Pat. No. 4,498,285 (Kreij). The combustion gases are then mixed with air and cooled, so that a valve in the pressure vessel wall is not subjected to gases of such extremely high temperatures. In a valve in the bed vessel wall a certain leakage into the bed vessel may be tolerated. However, this method is also not wholly satisfactory.

Another solution is to have a cut-off valve in the hot gas conduit leading to the turbine with a small leakage and let gas leak through the valve or have a by-pass valve in parallel with the cut-off valve. The problem is that the volume of air flowing through the hot bed of fuel in the bed vessel is reduced to the point where the $O_2$ content does not suffice for complete combustion of the fuel present in the bed. Combustible gases, e.g. of carbon monoxide (CO), are thus formed and may start burning downstream of the cut-off valve in the gas conduit and give rise to an impermissibly high gas temperature and an impermissibly high gas turbine speed.

There is also a possibility of sinter formation in the bed due to uncontrolled combustion and cooling within the bed volume.

SUMMARY OF THE INVENTION

In the case of an operational disturbance in the turbine unit, the gas turbine and the compressor are isolated because a valve in the hot gas conduit between the bed vessel of the plant and the turbine and a valve in the air conduit between the compressor and the pressure vessel, surrounding the bed vessel, are both shut off. At the same time a by-pass valve is opened in a short-circuit conduit between the air conduit from the compressor and the hot gas conduit to the turbine. The only hot gas flow to the turbine will then be the leakage flow through the valve in the hot gas conduit. In the case of an operational disturbance requiring an extended shutdown of the turbine-compressor unit, at least one further valve is opened for blowing off compressed combustion air from the pressure vessel in such an amount that the outflow of hot combustion gases from the bed vessel to the pressure vessel is prevented, and the bed material in the bed vessel is supplied with an inert gas in such an amount that the supply of combustion air to the bed in the bed vessel is prevented. By inert gas is meant a gas which does not maintain combustion, for example nitrogen gas. The rate of pressure reduction is limited by the leakage flow through the valve in the hot gas conduit between the bed vessel and the turbine and by the gas flow in a dust cleaning system for feeding out ashes from a gas cleaner, for example a cyclone cleaner. Inert gas is desirably supplied in such an amount that the admission of air to the bed is prevented. A certain flow of nitrogen gas can be obtained through the bed. Also the free space in the bed vessel above the bed may be supplied with inert gas for diluting the combustion gases.

The supply of inert gas may be controlled in several different ways as will be described in detail hereafter.

For example, by means of one or more transducers, the pressure difference between the space in the pressure vessel outside the bed vessel and the free space inside the bed vessel may be measured. The measurement signals can be supplied to a signal processing device which compares the actual value of the pressure difference with a suitably chosen desired value. An operating output signal, depending on the difference, can then be supplied to an operating device for setting a value in a supply conduit for inert gas from a pressure source of the gas. With control in dependance on the pressure difference, the inert gas consumption can be contained. On the other hand, relatively expensive and accurate control equipment is required.

With a pressure transducer which is connected to a space within the pressure vessel, for example the space between the pressure vessel and the bed vessel, the pressure in the pressure vessel can be measured. A signal representing this pressure can then be supplied to a signal processing device which delivers an output signal, depending on the pressure in question, which is supplied to an operating device for setting a valve in a supply conduit for inert gas leading from a pressure source of such gas in such a way that an amount of gas sufficient for the pressure in question is supplied. The control equipment is simple in this case but the gas consumption is greater than when controlling the gas supply on the basis of the differential pressure existing between the bed vessel and the surrounding space.

One further possibility of controlling the flow of inert gas is to dimension the container for the inert gas and the conduit therefrom in such a manner and to locate a valve in this gas conduit, which valve, upon an operational disturbance, is operated to a fully-open position while at substantially the same time the blow-off valves communicating with the pressure vessel are opened. When the pressure in the pressure vessel successively drops during blow-off, the leakage flow through the valve in the hot gas conduit of the turbine is also reduced. The demand for inert gas is reduced. By choosing the volume of the inert gas container and the conduit therefrom such that the pressure in this container and in the pressure vessel drop in parallel and at the same rates, inert gas may be supplied in a suitable amount during the whole pressure reduction period.

BRIEF DESCRIPTION OF THE DRAWINGS

The accompanying drawings show, by way of example, embodiments of the invention as applied to a PFBC plant. In the drawings:

FIG. 5 shows graphically a desired relationship between the rate of pressure reduction in the pressure vessel in the case of blow-off of combustion air and the rate of pressure reduction in the bed vessel because of leakage flow through the valve in the hot gas conduit to the turbine.

DESCRIPTION OF PREFERRED EMBODIMENTS

Figure 1:
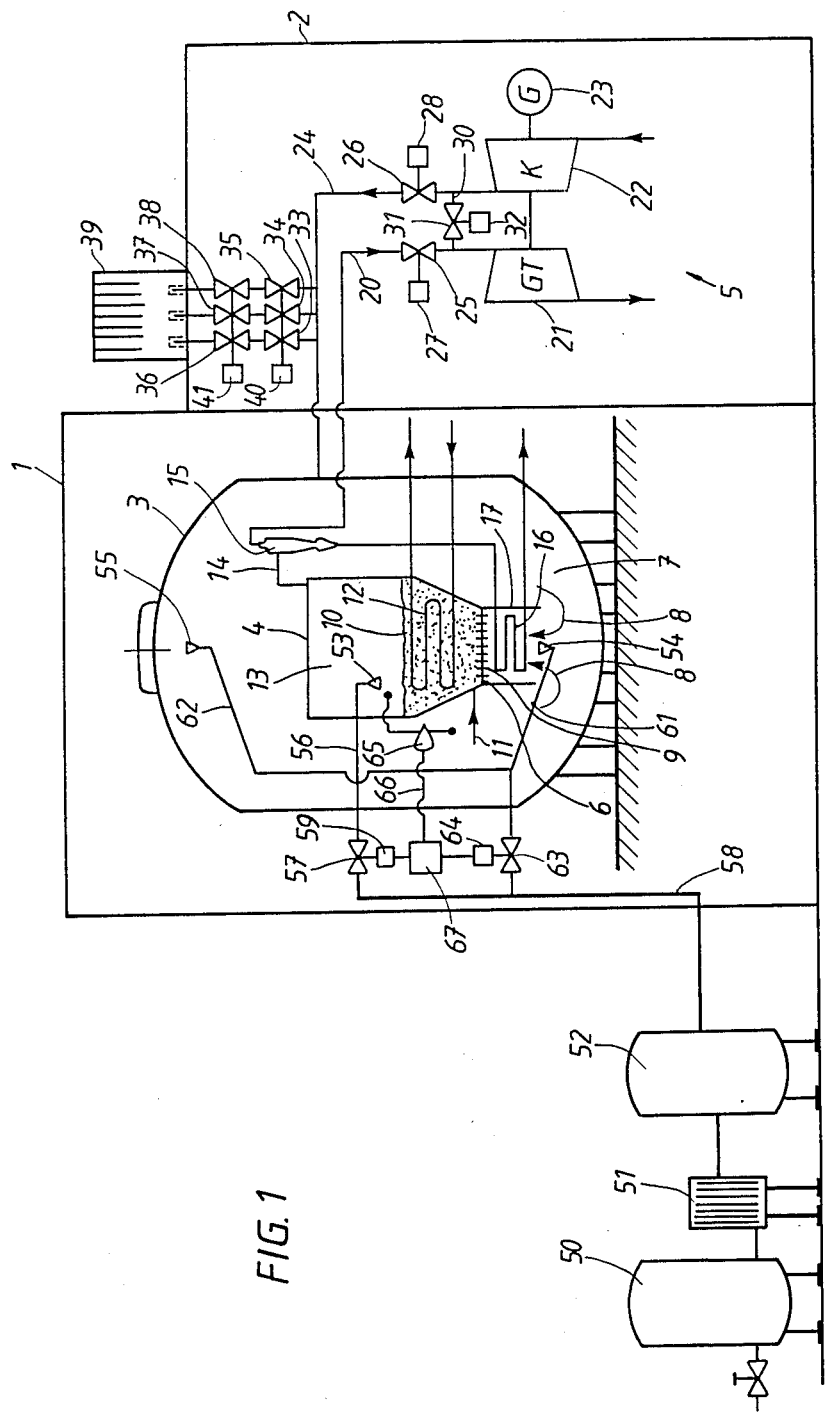
FIG. 1 shows a PFBC plant in which protection control is based on the differential pressure existing between the pressure vessel and the bed vessel.

In FIGS. 1-4, 1 and 2 designate buildings enclosing, respectively, a pressure vessel 3 with a bed vessel 4 and a turbine-compressor plant 5. The bed vessel 4 is provided with a bottom 6 with nozzles 9, through which the bed vessel 4 is supplied with combustion air from a space 7 between the bed vessel 4 and the pressure vessel 3, as indicated by the arrows 8. The bed vessel 4 contains a bed 10 of particulate material. Air flowing into the vessel 4 through the nozzles 9 fluidizes the material in the bed 10 and supports the combustion of fuel which is supplied to the bed through a fuel conduit 11. The bed vessel 4 accommodates a nest of boiler tubes 12 which cools the bed 10 so that the temperature thereof is kept at a level suitable for the combustion process, usually within the range 800°-950° C., and which generates steam for operation of a steam turbine (not shown). The combustion gases are collected in a free space 13 above the bed 10 and are conducted through a conduit 14 to a cleaning plant 15 symbolized by a single cyclone. Dust separated in the cleaning plant 15 is fed out through a pressure-reducing feeding-out device 16, which is formed as an ash cooler. The device 16 is shown located in a channel 17 below the bottom 6 of the bed vessel 4 and this is one convenient arrangement. The combustion air constitutes a coolant and the heat lost from the dust is utilized in heating the combustion air flowing into the bed 10.

The combustion gases are conveyed via a conduit 20 from the cleaning plant 15 to a gas turbine 21, which drives a compressor 22 and a generator 23. Air compressed in the compressor 22 is conducted via a conduit 24 to the space 7. The conduits 20 and 24 are provided with cut-off valves 25 and 26, respectively, which are operated by means of operating devices 27 and 28, respectively. Between the conduits 20 and 24 there is a by-pass or short-circuit conduit 30 with a valve 31 which is operated by means of an operating device 32. The conduit 30 is connected to the conduits 20 and 24 between the valve 25 and the gas turbine 21 and between the valve 26 and the compressor 22, respectively. A number of blow-off valves 33, 34 and 35, with respective test valves 36, 37 and 38 arranged in series therewith, are connected to the air conduit 24. These blow-off valves and test valves are operated either in groups by a common operating device 40 and 41, respectively, for each group, or by separate operating devices. On the building 2 there is provided a noise suppressor 39 to reduce noise pollution in the event of there being a discharge of blowoff air. The valves 33-35 may alternatively be directly connected to the pressure vessel 3 or to the channel 17 in such a way that the ash cooler 16 is also cooled by an air flow during a blow-off.

The plant includes an inert gas system with nitrogen as the inert gas. Outside the building 1 there is a storage tank 50 for liquid nitrogen, an evaporator 51 and a buffer tank 52 containing compressed nitrogen gas.

In the embodiment shown in FIG. 1, a nozzle 53 is provided in the free space 13 of the bed vessel 4, and in the space 7 between the pressure vessel 3 and the bed vessel 4 two nozzles 54 and 55 are provided, through which the free space 13 and the space 7, respectively, can be supplied with nitrogen gas. The nozzle 53 is connected to the buffer tank 52 via a conduit 56, a valve 57 with an operating device 59 and a conduit 58. The nozzles 54 and 55 are connected to the buffer tank 52 via conduits 61 and 62, respectively, a valve 63 with an operating device 64 and a conduit 58. A differential pressure transducer 65 is connected to the space 7 and to the free space 13 and, via a conduit 66, to a central control unit 67. The operating devices 59 and 64 control the opening of the valves 57 and 63 in dependence on the pressure difference between the free space 13 and the space 7. Gas supplied through the nozzle 53 dilutes the combustion gases in the free space 13 of the bed vessel 4. Gas supplied through the nozzle 54 in the channel 17 blocks the supply of combustion air to the bed 10. Gas supplied through the nozzle 55 dilutes the combustion air in the space 7 so that the oxygen concentration in the combustion air in the space 7 can also be achieved solely by relying on the supply of inert gas through the nozzle 54.

In the case of a disturbance in the operation of the gas turbine-compressor unit of the plant, for example in the case of gas turbine trip following a load drop out, the valves 25 and 26 in the conduits 20 and 24 are shut off while at the same time the valve 31 in the by-pass conduit 30 is opened so as to obtain a short-circuit between the compressor 22 and the gas turbine 21. A leakage flow of hot gas through the valve 25 cannot be prevented. The turbine 21 is thus still supplied with a certain amount of driving energy.

The bed 10 contains fuel at combustion temperature. When the valve 25 is closed, the air supply to the bed 10 is reduced, which gives rise to an air deficit and the formation of carbon monoxide in the combustion gases. This carbon monoxide in leakage gas passing through the valve 25 can be ignited and be burnt with the air from the compressor 22. The gas temperature and the energy supply to the turbine 21 may, in this way, both become impermissibly high.

By supplying nitrogen gas in a suitable amount and in a suitable manner to the bed vessel 4 and/or the channel 17, the generation of carbon monoxide may be reduced to a harmless level or it can even be completely eliminated. Sinter formation is also eliminated. Nitrogen gas supplied to the bed vessel 4 through the nozzle 53 in the free space 13 dilutes the combustion gases so that the carbon monoxide content and the temperature drop. Nitrogen gas supplied to the channel 17 prevents or reduces the oxygen supply to the bed 10 and reduces the combustion. The supply of nitrogen gas is controlled so that the flow of combustion air to the bed 10 is inteerrupted.

If the disturbance cannot be eliminated and if normal operation cannot be resumed within a short time, the entire plant must be taken out of operation. The air in the space 7 is blown off by opening one or more of the valves 33–35. The test valves 36–38 are normally open and are only shut when the valves 33–35 are function tested or in the event of a fault on such a valve.

The valves 33–35 can be dimensioned so that the blow-off of combustion air through these valves 33–35 provides a somewhat slower pressure reduction in the space 7 than what is provided by the leakage flow in the valve 25 and the flow through the ash discharge device 16 in the bed vessel 4, as shown in FIG. 5. In FIG. 5 the upper curve $P_1$ represents the relationship between time and pressure in the space 7 when blowing off air from the pressure vessel 3, and the lower curve $P_2$ represents the relationship between time and pressure in the bed vessel 4 used by the leakage flow through the valve 25. The difference $P_1-P_2$ is made to be positive, that is, greater than zero, so that no outflow of combustion gases from the bed vessel 4 into the space 7 can occur. Further, it is desirable to prevent air flow into the bed vessel 4 so that the combustion of residual fuel in the bed 10 is interrupted.

The air flow to the bed 10 and hence the combustion process therein are interrupted by supplying inert gas to the channel 17 through the nozzle 54. In the embodiment shown in FIG. 1, the pressure difference $P_1-P_2$ is controlled to a small positive value by supplying inert gas through the nozzle 53 into the free space 13 at the upper part of the pressure vessel 3 in suitable proportions so as to maintain a desired pressure difference $P_1-P_2$.

Figure 2:
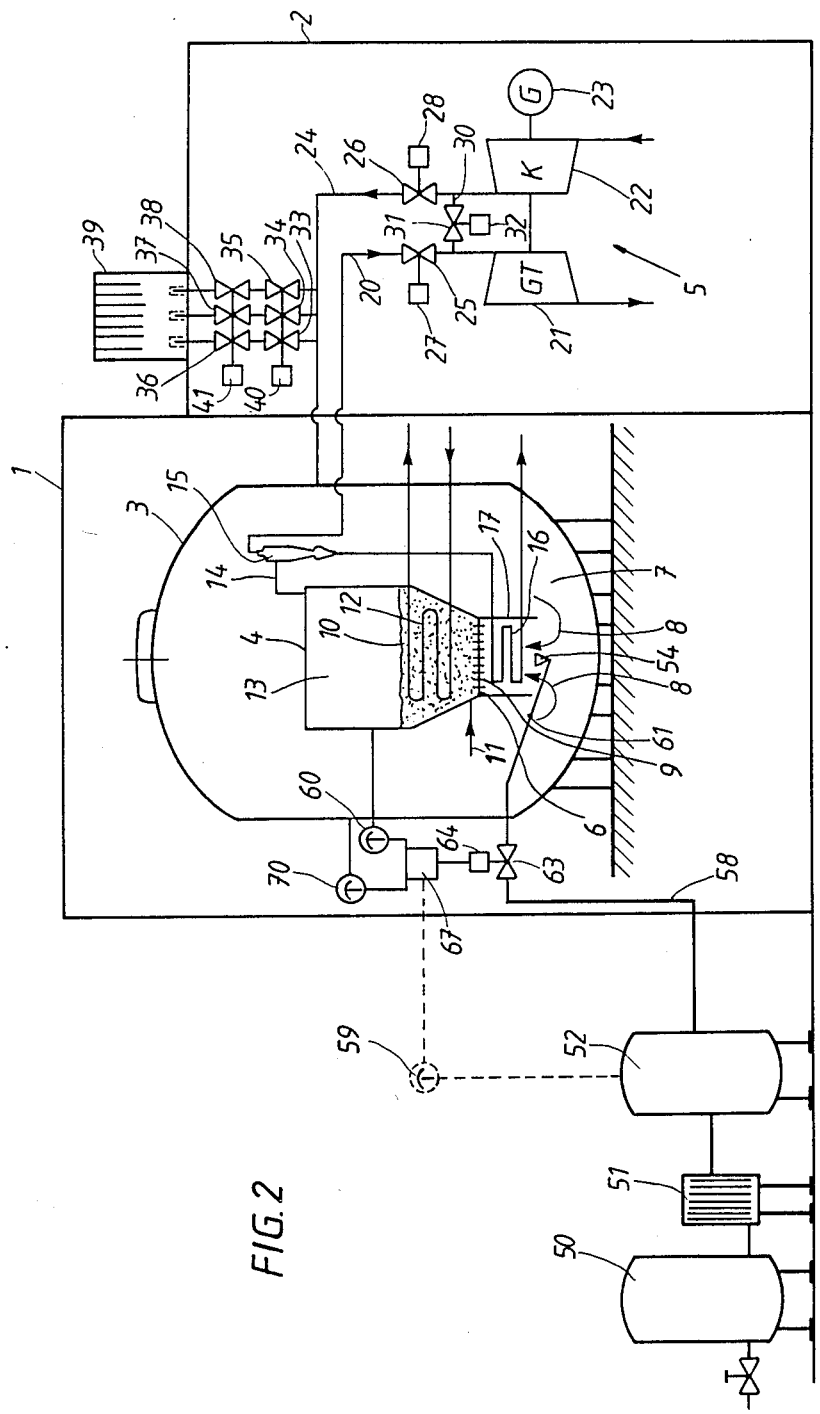
FIGS. 2 and 3 show two embodiments of PFBC plant in which protection control is based on the pressure existing in the pressure vessel.

In the embodiment shown in FIG. 2, the pressure in the pressure vessel 3 is measured by a pressure transducer 70 and the pressure in the free space 13 is measured by a pressure transducer 60. Both the gas flow through the blow-off valves 33–35 and the leakage flow through the valve 25 are a function of the pressure $P_1$ in the pressure vessel 3. The output signal from the pressure transducers 60 and 70 is supplied to the central control unit 67 and is compared there with a stored desired value for a selected pressure difference at the pressure $P_1$ in question. From the central control unit 67 a control signal is delivered to the operating device 64 of the valve 63, the valve 63 thus being opened in dependence on this control signal so that a necessary inert gas flow at the pressure in question is obtained for maintaining a positive pressure difference $P_1-P_2$ between the channel 17 and the space 7. In the embodiment shown, all inert gas is supplied to the combustion air channel 17.

Surplus gas, that is, the gas which does not pass through the bed 10, flows out into the space 7 and is mixed with the air there. Also a pressure transducer 59 which measures the gas pressure in the buffer tank 52 may be connected to the central control unit 67.

Figure 3:
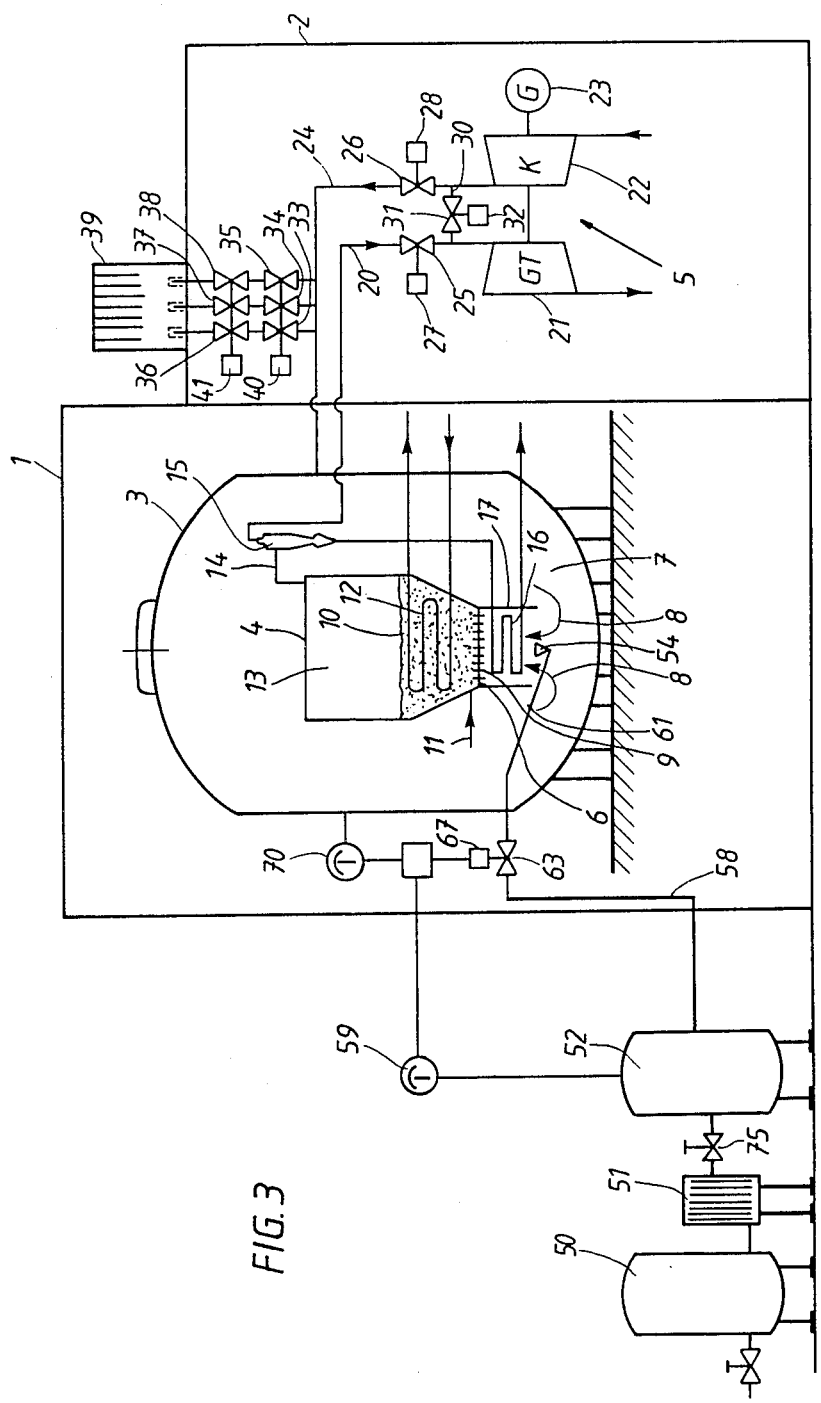

In the embodiment according to FIG. 3, the pressure in the pressure vessel 3 is measured by a pressure transducer 70 and the gas pressure in the buffer tank 52 is measured by a gas transducer 59. The necessary supply of inert gas for maintaining a pressure difference $P_1-P_2$ is a function of the pressure $P_1$ in the pressure vessel 3. The valve 63 is controlled in dependence on the pressures in the pressure vessel 3 and the buffer tank 52 so that at each pressure in the pressure vessel 3 and the buffer tank 52, a flow of nitrogen gas, predetermined for the pressure in the pressure vessel 3, is obtained.

Figure 4:
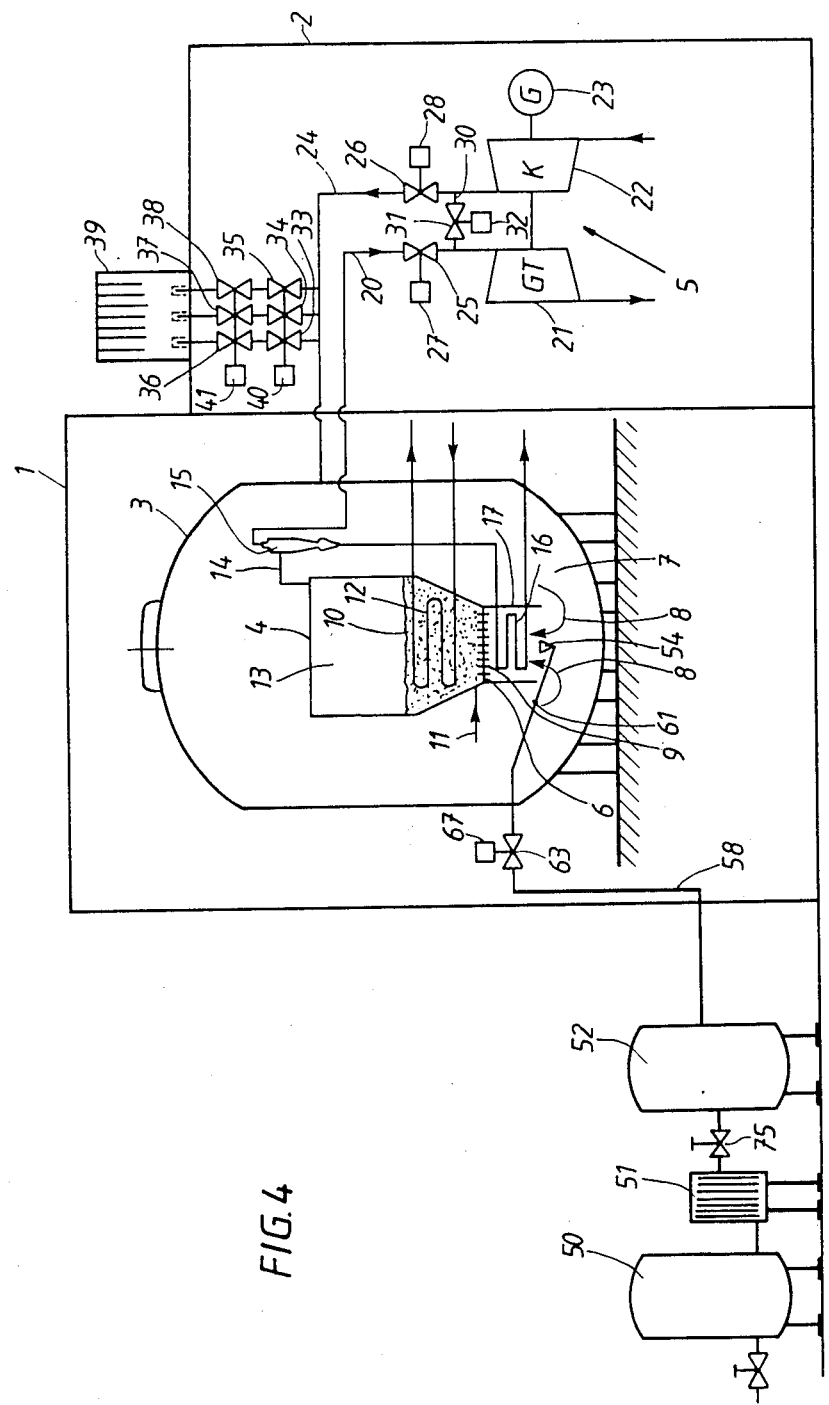
FIG. 4 shows a PFBC plant in which protection control is based on the dimensioning of the pressure vessel for the inert gas.

In the embodiment according to FIG. 4, the supply of inert gas is controlled by a suitable dimensioning of the buffer tank 52 and the conduit 58. The buffer tank 52 is filled with nitrogen from the storage tank 50 to a certain predetermined pressure, after which a valve 75 between the evaporator 51 and the storage tank 50 is closed. Upon a load drop out and cut-out of the valve 25 in the hot gas conduit 20 and an opening of the blow-off valves 33–35, the central control unit 67 is at the same time supplied with an operating signal and the valve 63 is fully opened. By dimensioning the valves 33–35, the buffer tank 52 and the conduit 58, the pressures in the space 7, the bed vessel 4 and the buffer tank 52 drop at approximately the same rate. During the entire blow-off operation and the pressure reduction, the gas flow through the valve 25 decreases while at the same time the inert gas flow from the buffer tank 52 decreases because of falling pressure therein. The dimensioning must be such that a sufficient amount of inert gas is supplied at the greatest calculated leakage gas flow through the valve 25. Surplus gas, that is, that amount of inert gas that does not pass through the bed 10, flows out into the space 7 and is mixed with the air there. The simplification of the control according to this embodiment outweighs the cost of the surplus inert gas that has to be used for security reasons in view of the difficulties of obtaining the correct amount of gas for all operating conditions.

The invention is not limited to the embodiments described since various changes may be made thereto within the scope of the following claims.

What is claimed is:

1. A method of controlling a PFBC power plant comprising
   a bed vessel enclosed within a pressure vessel and surrounded by compressed combustion air, said bed vessel containing a bed of fluidizable particulate material with combustible material therein,
   a gas turbine-compressor unit, a supply conduit leading combustion gases from the bed vessel to the turbine of the unit to drive the same, a first cut-off valve in the supply conduit,
   an outlet conduit for gas compressed in the compressor of the unit, a second cut-off valve in the outlet conduit, a by-pass conduit extending between the supply and outlet conduits between the first cut-off valve and the turbine and between the second cut-off valve and the compressor, and a third cut-off valve in the by-pass conduit which method, in the event of an operational disturbance in the gas turbine-compressor unit, includes the steps of closing the first and second cut-off valves to isolate the unit from the bed vessel, opening the third cut-off valve in the by-pass conduit, reducing the pressure in the bed vessel and in the pressure vessel, and supplying an inert gas to the bed vessel to reduce the concentration of oxygen in the gas supplied to the combustible material in the bed.

2. A method according to claim 1, in which the supply of inert gas is controlled in such a way that the pressure in the pressure vessel always exceeds the pressure in the bed vessel.

3. A method according to claim 1, in which inert gas is fed into the bed vessel above the level of the bed therein.

4. A method according to claim 1, in which the pressure difference between the bed vessel and the pressure vessel is measured and is compared with a desired value, and a signal depending on the difference between the actual and desired values is employed to open a valve controlling the flow of inert gas to the bed vessel.

5. A method according to claim 4, in which the inert gas is fed to combustion air entering the bed vessel and also the space above the bed in the bed vessel.

6. A method according to claim 1, in which the pressure inside the pressure vessel is measured and is compared with a desired value for the measured pressure to create a difference signal, the difference signal being used to determine the rate of supply of inert gas to the bed vessel.

7. A method according to claim 1, in which a valve in an inert gas supply conduit is fully opened and the supply of inert gas is controlled by a choice of the size of a pressure medium source and the resistance to flow of inert gas caused by the inert gas supply conduit, so that the amount of insert gas supplied is reduced when the rate of pressure reduction in the pressure vessel decreases owing to reduced leakage of flow through the first cut-off valve caused by a falling pressure.

* * * * *